Sept. 20, 1966      L. B. HOLMAN      3,273,409

MOTION GENERATOR MEANS

Filed May 6, 1963      2 Sheets-Sheet 1

INVENTOR.
LEE B. HOLMAN
BY Miketta and Glenny
ATTORNEYS.

Sept. 20, 1966 L. B. HOLMAN 3,273,409
MOTION GENERATOR MEANS
Filed May 6, 1963 2 Sheets-Sheet 2
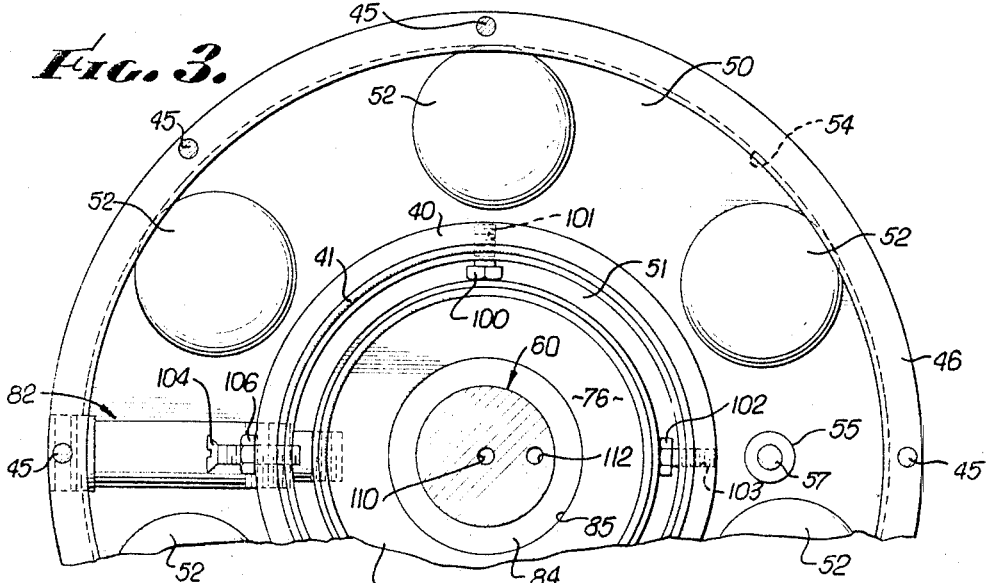
FIG. 3.
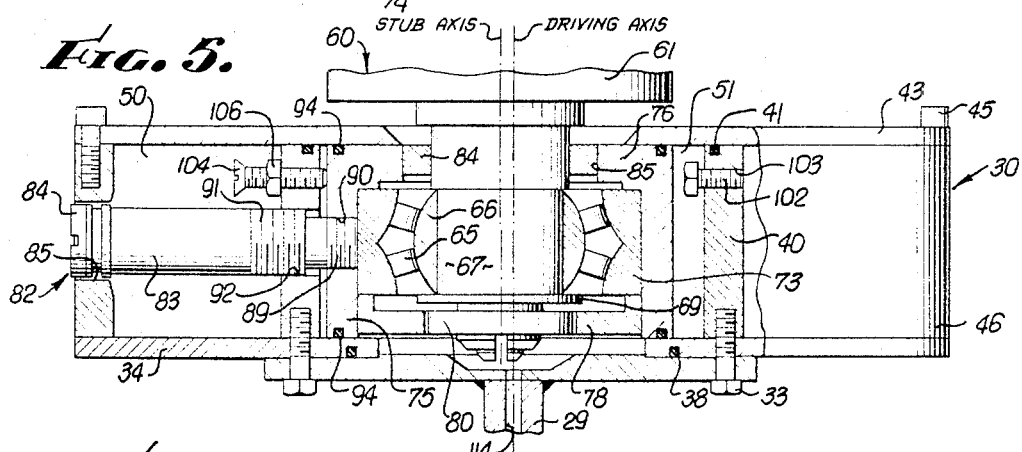
FIG. 5.
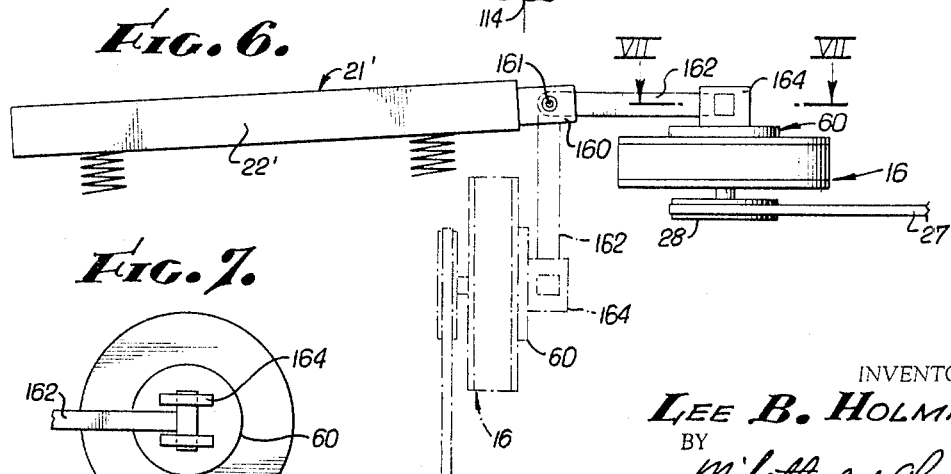
FIG. 6.
FIG. 7.
INVENTOR.
LEE B. HOLMAN
BY
Miketta and Glenny
ATTORNEYS.

United States Patent Office 3,273,409
Patented Sept. 20, 1966

1

3,273,409
MOTION GENERATOR MEANS
Lee B. Holman, Whittier, Calif., assignor to State Steel Products, Inc., City of Industry, Calif., a corporation of California
Filed May 6, 1963, Ser. No. 278,176
12 Claims. (Cl. 74—86)

This invention relates to means for producing or generating motion in a receptacle means for agitating material of different characteristics fed thereto for producing a desired separation of such material. More particularly, the invention relates to a unitary, compact motion generator means readily associated with separators of gyratory (circular) or rectangular type, or other means desired to be subjected to vibratory motion.

Various types of prior proposed devices have been employed to impart vibratory or agitating forces to a material carried in a receptacle to produce a desired separation of the material. Such prior proposed devices have been relatively complex, have been subject to relatively rapid wear, have employed eccentric means which required providing an eccentric surface machined about an axis offset from the normal axis of the eccentric means, and required special separate means to counterbalance vibrational forces transmitted to the support structure and/or floor. Because of the type of construction employed in such prior proposed devices, operation at high rotational speeds was not feasible. Adjustment of eccentricity was usually provided but either required disassembly of part of the device or required special eccentrically machined components to provide such adjustment. Thus, regulation of the amount of eccentric throw in order to produce a desired flow path of material being separated was time consuming and the separator was out of operation for a longer time than desired. Moreover, such prior proposed devices were usually especially designed for either a gyratory-type separator or a rectangular-type separator and were not interchangeable or readily adapted for installation on the other separator type.

The present invention contemplates a motion generator means adapted to be utilized with either a gyratory-type separator or a rectangular-type separator or other vibratible device. Generally speaking, the invention contemplates a compact, unitary, universal motion generator device comprising a rotatable driving means including a driving shaft carrying an outer annular housing provided with an inner bearing receiving chamber and an outer annular chamber which provides a peripheral raceway for discrete counterbalancing elements such as ball weights. The bearing chamber receives a non-rotatable stub shaft or pin means connected with a receptacle means which is resiliently supported for two or three dimensional movement in order to produce a desired flow path for material to be separated. A bearing means is carried by the stub shaft and includes an outer bearing housing including an outer race member, the bearing means being laterally movable relative to the axis of the driving shaft. Adjustment means is carried by the outer housing and is connected with the bearing housing for selectively positioning the axis of the stub shaft in offset or eccentric relation to the axis of the driving means. Vibratory or agitating forces are thus transmitted to the receptacle means because of the eccentric relation of the separate stub shaft and driving means while the counterbalance elements in the outer annular raceway of the outer housing are self-positionable to prevent vibratory force transmission to the driving shaft and to support structure for the separator apparatus. The motion generator means thus provides adjustable eccentric relationship between the non-rotatable stub shaft and the rotatable driving means and also serves as a coupling between the non-rotatable

2 shaft and the rotatable driving means. Such a motion generator means is very compact, of relatively small height, occupies relatively little space, and affords ease of adjustment heretofore not achievable by prior proposed constructions known to me.

A feature of the motion generator means of this invention is the particular movable arrangement of the bearing means and the bearing load distribution because of force components developed due to eccentric relation of the axes of the rotating and non-rotating parts of the generator means. A motion generator means of the present invention provides a reduction in the bearing load per unit of bearing surface by placing loads caused by eccentric forces on the outer race member of the bearing means instead of the inner race members as usually done. As a result bearing life and maintenance is improved and operation at higher rotational speeds is possible for long periods of time. In this respect it should be noted that separators, on which the present motion generator means is utilized, are designed and intended for continuous use as a part of a process or production line.

The primary object of this invention therefore is to disclose and provide a self-balancing, compact, unitary vibratory motion generator means embodying a novel construction.

An object of the invention is to provide a motion generator means readily adaptable to separators of different types.

Another object of the invention is to disclose and provide a separator means provided with convenient, readily accessible adjustment means for adapting the separator means to different types of materials, objects, produce, and the like desired to be separated.

A further object of the invention is to disclose and provide a motion generator means adapted to produce two-dimensional vibratory force components or three-dimensional force components whereby a flow pattern of material may be selected to produce the most efficient separation of the material.

A still further object of the invention is to provide a novel bearing arrangement for a vibratory motion generator means which improves bearing life and provides a novel means for producing vibratory motion.

More specifically, the invention contemplates a novel construction of a motion generator means in which a non-rotatable, vibratory motion transmitting member is movable laterally with respect to an axis of a rotatable driving means and wherein an inner bearing means carried by the non-rotatable member is provided lateral slidable sealing relation with a roatable outer generator housing, the relative lateral movement being controlled by guide means and the extent of such movement being regulated by a readily accessible adjustment bolt connecting in self-locking relation the generator housing and the outer race member of the inner bearing. The specific construction of the motion generator means of the present invention permits the use of cylindrical surfaces coaxially related with respect to the axis of the member upon which the cylindrical surfaces are provided and avoids an eccentric machining operation.

Various other advantages and objects of the present invention will be readily apparent to those skilled in the art from the following description of the drawings in which exemplary embodiments of the invention are shown.

In the drawings:

FIG. 3 is a sectional view taken in a horizontal plane indicated by the line III—III of FIG. 2.

FIG. 5 is a fragmentary sectional view taken in the vertical plane of FIG. 2 and showing adjustment for maximum eccentricity.

FIG. 6 is a schematic view showing the motion generator means of FIG. 2 adapted to a rectangular type separating apparatus.

FIG. 7 is an enlarged fragmentary sectional view taken in the plane indicated by lines VII—VII of FIG. 6.

Figure 1:
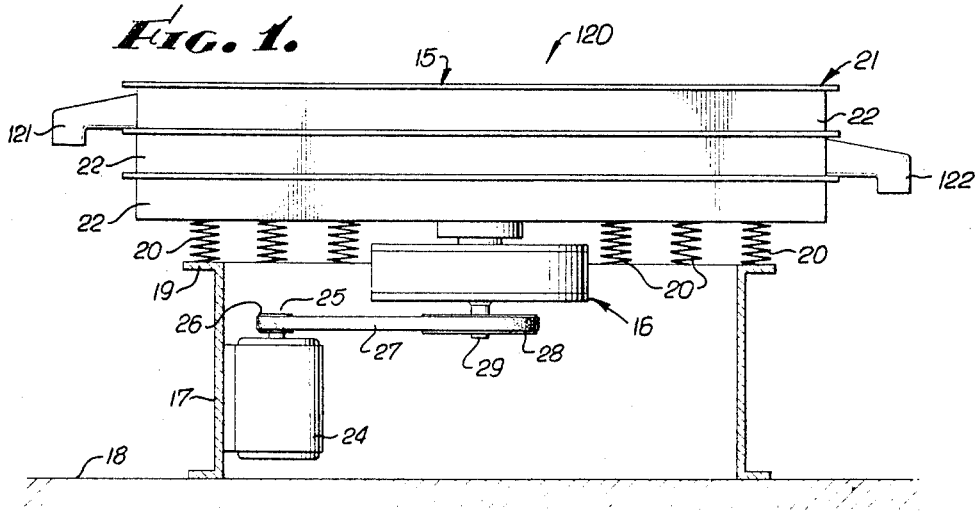
FIG. 1 is an elevational view partly in section of a gyratory separator embodying this invention.

An exemplary gyratory separating apparatus generally indicated at 15 (FIG. 1) includes a vibratory producing or motion generator means generally indicated at 16 embodying this invention. The gyratory separator means 15 includes generally a cylindrical base wall 17 fixed to a supporting surface such as a floor 18 in suitable manner. Base wall 17 may include a horizontally extending outwardly directed, annular flange 19 providing a seat for a plurality of circumferentially spaced coil springs 20 which serve to resiliently support a receptacle means generally indicated at 21. The receptacle means 21 may include one or more screen frame sections 22 constructed in suitable manner and having a screen mesh or a screen design adapted to provide a desired separation of material.

The separator apparatus 15 also includes a motor means 24 mounted on the base wall 17 in suitable manner and provided with a motor shaft 25 having a pulley 26 thereon connected by belt 27 to a pulley 28 carried on a pulley driving shaft 29 of motion generator means 16. It will be understood that the construction of the driving means just described, the base wall 17, resilient springs 20 and receptacle means 21 may be any suitable selected construction and are not described in detail.

Motion generator means 16 is supported from receptacle means 21 and includes in addition to pulley shaft 29, a generator housing 30 including a bottom cover plate 31 secured as by welding at 32 to the top end face of pulley shaft 29. Plate 31 may carry a plurality of circumferentially spaced, upstanding stud bolts 33 which secure thereto an annular bottom wall 34, the inner peripheral margins of bottom wall 34 being seated at 35 in a shallow annular recess 36 provided on the top surface 37 of plate 31. An annular seal means 38 is provided between plate 31 and bottom wall 34.

Housing 30 also includes an inner cylindrical wall 40 coaxial with the axis of pulley shaft 29 and secured against bottom wall 34 by stud bolts 33. Seal means 41 may be carried by the top edge face of annular wall 40 for sealing engagement with top wall 43 of housing 30. Top wall 43 is of the same diameter as annular bottom wall 34 and carries a plurality of circumferentially spaced downwardly extending stud bolts 45 which engage a cylindrical outer housing wall 46. Outer wall 46 may be seated at 47 on the outer periphery of the top surface of bottom wall portion 34 and may be secured thereto as by welding or as by a plurality of circumferentially spaced stud bolts (not shown) in the manner of stud bolts 45. The top wall 43 is provided with an opening 48 coaxially aligned with the axis of shaft 29.

The generator housing 30 thus includes a flywheel-like housing rotatable with driving pulley shaft 29 and is provided with an outer annular chamber 50 and an inner central bearing chamber 51, said chambers having the common annular wall 40. The annular outer chamber 50 provides a peripheral raceway means for counterbalance weight elements 52 such as metal balls of selected diameter and weight. The raceway further includes a shallow, concave groove 54 provided in the internal surface of outer wall 46, the bottom of said groove lying approximately midway between the top and bottom edges of wall 46. A partition member 55 extends between top wall 43 and bottom wall 34 to divide the annular raceway into two generally semi-circular paths for the counterweight balls 52. The partition member 55 may be suitably fixed with respect to walls 43 and 34 as by ports 56 in said walls for reception of pin members 57 at opposite ends of partition member 55.

The axis of rotation of generator housing 30 coincides with the axis of driving shaft 29 and all of the cylindrical surfaces of outer wall 46, inner wall 40 are concentric therewith.

Figure 2:
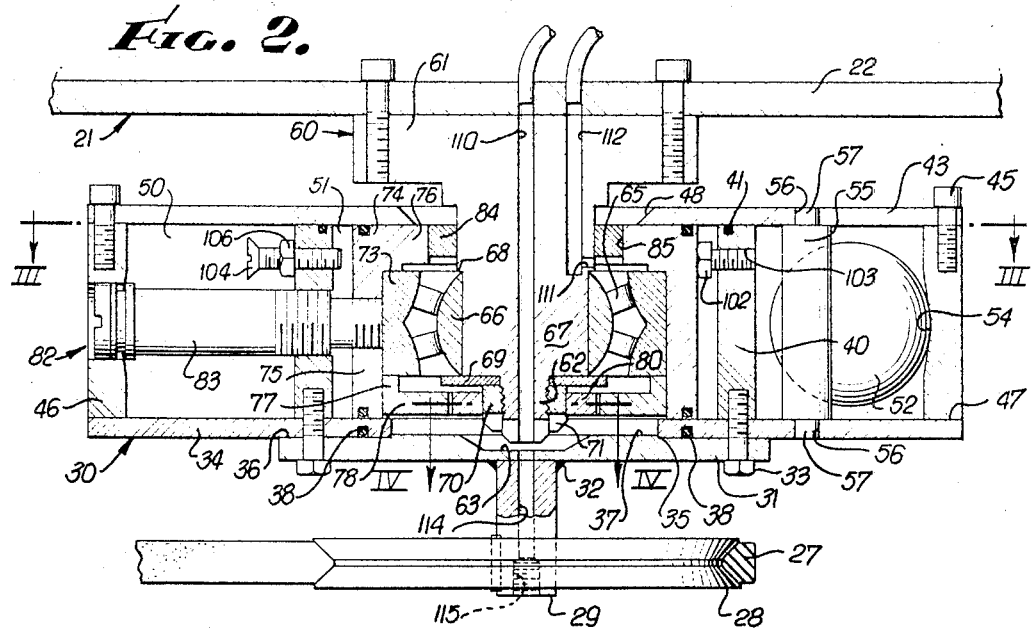
FIG. 2 is a sectional view taken in a vertical plane bisecting the motion generator means shown in FIG. 1.

Motion generator means 16 also includes a non-rotatable pin member or stub shaft 60 provided with an enlarged top circular head 61 adapted to be connected with receptacle means 21 at the bottom wall of the bottom screen section 22 by suitable means, such as bolt assemblies, welding, or the like. The axis of stub shaft 60 is coaxial with the axis of receptacle means 21. The bottom end 62 of stub shaft 60 is spaced from plate 31 and, in this example, a cavity 63 may be provided in plate 31 beneath bottom end 62 of stub shaft 60. Stub shaft 60 is received through opening 48 in top wall 43, is positioned within the inner bearing chamber 51, and, in FIG. 2, is shown in coaxial relation with driving shaft 29.

Within bearing chamber 51 stub shaft 60 carries a self-aligning bearing means 65 comprising an inner race 66 seated on a reduced portion 67 of shaft 60 and against a shoulder 68 formed thereby. A bottom bearing retainer plate 69 may be secured by a nut 70 threaded on end 62 of shaft 60. Nut 70 may be provided with diametrical slots 71 in 90° spaced relation.

Outer race member 73 of bearing means 65 may be seated in a bearing housing member 74 provided with a cylindrical wall 75 and an inwardly extending top flanged portion 76 providing a shoulder for the top edge of outer race member 73. The bottom edge of race member 73 may be secured by an upstanding annular rib 77 provided on a bottom bearing housing wall 78 press fitted in the wall 75.

Bottom wall 78 is spaced above the top surface of the bottom wall 34 and in this example provides a housing or support for a pilot bearing 80 pressed upon the outer cylindrical surface of the nut 70. Opening 81 in the pilot bearing housing wall 78 is, in this example, not truly circular, but instead, slightly oval in plan, the long dimension of the oval lying along a diameter that intersects the center of partition member 55 and the axis of an adjustment means generally indicated at 82. The slightly oval configuration is exaggerated as shown in FIG. 5 and, in practice, the long diameter of opening 81 may exceed its short diameter by approximately ten-thousandths of an inch. The purpose of oval opening 81 is to permit self-aligning bearing 65 to adjust to skew relationships of the axis of stub shaft 60 to the axis of driving shaft 29.

It is important to note that the stub shaft 60, bearing means 65, pilot bearing 80, and bearing housing member 74 include cylindrical surfaces concentric to the axis of shaft 60, the sole exception in this example being opening 81.

Inturned flange 76 may carry a suitable seal means 84 in the space between stub shaft 60 and the opening 85 provided in the bearing housing member 74.

In FIG. 2 the axes of the stub shaft 60 and driving shaft 29 are shown in alignment and the shafts in tandem axial spaced relation. In FIG. 5 the axis of stub shaft 60 is shown in lateral offset relation to the axis of driving shaft 29, the axes extending in the same direction. Adjustment means 82 for such axial offset relation includes an adjustment bolt 83 having an outer screw-headed end 84 received within a port 85, bolt 83 extending along a diameter aligned with partition member 55. A reduced end 89 of bolt 83 may be provided with threads of a selected pitch for threaded engagement at 90 with a tapped bore in inner bearing housing wall 75. Spaced from the end 89, bolt 83 is provided with a threaded portion 91 having threaded engagement at 92 with a tapped opening in the inner wall 40, the pitch of the threads of the threaded portion 91 being different than the pitch of the threads of the threaded end 89. In this example, the pitch of the threads of portion 91 may be 8 threads per inch while the pitch of the threaded end 89 may be 16 threads per inch. Thus, by turning adjustment bolt 83 by a suitable tool, such as a screwdriver, bolt 83 may be advanced or retracted and in such advancement or retraction, the bearing means 65 and stub shaft 60 will be moved laterally of generator housing 30 within bearing chamber 51 to laterally move the axis of non-rotating stub shaft 60 with respect to rotating driving shaft 29 and into a selected offset or eccentric relation. In this respect it should be noted that the inner bearing housing, is provided lateral sealed sliding movement relative to top wall 43 and bottom wall 34 and for sealing purposes, seal means 94 may be provided between the inner bearing housing and said walls 43 and 34. Such lateral movement may be accomplished because of the resilient support of the receptacle means 21 on the plurality of springs 20. The axis of the non-rotatable shaft portion 60 is thus readily moved into eccentric relation with the driving axis.

The provision of spaced threaded portions of different pitch on adjustment bolt 83 provides a self-locking arrangement whereby turning of bolt 83 may be accomplished by a suitable tool but any tendency of the bolt 83 to turn during operation is resisted by the difference in pitch of the threaded portions since the one set of threads tends to longitudinally move bolt 83 at a different rate than the other set of threads.

Means for guiding the inner bearing housing during such lateral movement with respect to the outer generator housing 30 may comprise a pair of diametrically opposite guide nut 100 threaded bores 101 in inner wall 40. Nuts 100 may be readily adjusted so that proper space with selected tolerances is provided therebetween to receive and slidably guide the bearing housing. The width of the heads of nuts 100 do not require enlargement because the amount of lateral movement is relatively small and may be not greater than 1/4" or 3/8".

Stop means for limiting such lateral movement may be similarly provided by a stop nut 102 threaded in a threaded bore 103 provided in wall 40 and having its axis lying in a vertical plane passing through the diameter of the adjustment bolt 83. Diametrically opposite nut 102 may be provided an adjustment screw bolt 104 having threaded engagement in a threaded bore 105 directly above the threaded engagement at 92 of adjustment bolt 83 in wall 40. Screw bolt 104 includes a lock nut 106 for fixing the selected position of screw bolt 104. It will thus be apparent from a consideration of FIG. 2 and FIG. 5 that the opposed faces of bolts 104 and 102 determine the amount of lateral movement which inner bearing means may be moved by adjustment bolt 83, and thus determine the amount of eccentricity or eccentric throw provided between the axes of shafts 29 and 60.

Figure 4:
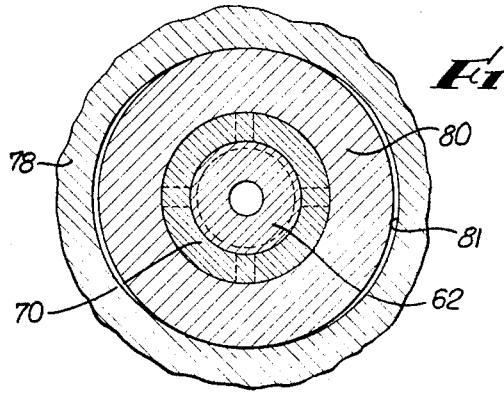
FIG. 4 is an enlarged fragmentary sectional view taken in the plane indicated by line IV—IV of FIG. 2.

Means for lubricating bearing means 65 and the pilot bearing 80 may comprise an axial bore 110 in stub shaft 60, said bore opening into the cavity 63 in the bottom plate 31. Lubricating fluid introduced from a suitable source through bore 110 fills cavity 63 and the space between bottom wall 78 of inner bearing housing 74 and the plate 31 of the outer generator housing and, at such cavity, the diametrically opposed slots 71 in nut 70 provide stationary surfaces which act as impelling means for such fluid when the outer generator housing is rotated. Rotation of the outer generator housing imparts centrifugal force to the lubricating fluid in cavity 63, the fluid being trapped in the space between bottom wall 78, plate 31, and the inner edge of bottom wall 34 and through opening 81 (FIG. 4) in the pilot bearing 80. The lubricant fluid is forced and works its way through the pilot bearing 80 into the space above the pilot bearing, through the self-aligning bearing 73 and thence over self-aligning bearing 65 through a port 111 and to an offset bore 112 in shaft 60. Thus, positive circulation of lubricating fluid is provided by the construction of the motion generator means of this invention. Pulley shaft 29 may be provided with a bore 114 serving as an extension of bore 110, said bore 114 having a tapped end 115 for threaded engagement with a bore closure plug (not shown).

The motion generator means 16 may also contain a body of fluid of selected viscosity which substantially fills outer annular chamber 50 and the inner bearing chamber 51. Such fluid serves as a dampening means for movement of balls 52 during starting and stopping of the motion generator means and provides a smooth transition when a change in speed is made.

Generally, in operation of the gyratory separator device shown in FIG. 5, material to be separated may be introduced axially along a path indicated at 120. As material falls into the receptacle means 21, vibratory or agitating forces are imparted thereto which produce a selected flow path of material on screen sections 22 and ultimately to the periphery thereof for discharge of particles of selected size from discharge spouts 121 and 122. In the example described above, motion generator means 16 is adjusted to be provided a desired eccentric throw by adjustment bolt 83 so that the axis of the shaft 60 and of shaft 29 is offset a selected distance. Energization of motor means 24 from any suitable electrical power source produces rotation of generator housing 30 through the pulleys and pulley belts 26, 28 and 27. Such rotation of the generator housing 30 produces through self-aligning bearing means 65 a vibratory impulse on stub shaft 60 which is transmitted to receptacle means 21. Since the receptacle means 21 is resiliently supported at its periphery, receptacle means 21 will be imparted motion force components in a plane or of two dimensional characteristics and, also, motion force components in a vertical direction or three-dimensional due to the non-axial alignment of the stub shaft 60 with the driving axis which is permitted by self-aligning bearing 65. Such skew relation or non-axial alignment is further facilitated by oval-shaped opening 81 in the pilot bearing housing and forces resulting from the slight skew relation are ultimately imparted to the material with a vertical force component.

In operation of motion generator means 16, it should also be noted that the presence of the counterweight ball elements 52 carried in the outer raceway chamber 50 will, through centrifugal force, be moved into a peripheral position in groove 54 to automatically counterbalance any vibratory forces being imparted to the drive means and the base wall of the gyratory separator. It should be noted that the generator housing 30 and concave groove 54 are concentric with the axis of drive shaft 29 and that inner bearing member 74, together with the enclosed self-aligning bearing means 65 and pilot bearing 80 serve as a floating adjustable hub means for connecting the generator housing and the drive shaft 29 to the non-rotating stub shaft 60 carried by the receptacle means 21. The concentricity of the housing and drive shaft and the equal loading of the counterweight ball forces during operation eliminates oscillation or vibration of the drive pulley, housing 30 and shaft 29. The counterweight ball elements 52 will seek a position which will tend to dynamically balance the generator housing while, at the same time, will not affect vibratory force components being transmitted to receptacle means 21. The semi-circular raceways provided by the partition member 55 and the adjustment bolt 83 may include any selected number of counterweight balls and, if desired, the partition 55 may be omitted so that said counterweight elements are provided almost 360° movement in the outer raceway. It will be apparent that the motion generator means operates in a compact planar zone of relatively small height. The counterweight ball elements 52 are guided under the effect of centrifugal force to seat and roll in the concave groove 54 provided in the outer wall 46 and thus force components which might cause an unbalance in the driving means of the generator means is avoided.

While pilot bearing 80 has been above described to permit rocking, skew, or non-axial alignment of stub shaft 60 with respect to the axis of driving shaft 29, it will be apparent that in the event a third dimensional force component is not desired that pilot bearing 80 or other suitable bearing means may be seated in the bearing wall without an oval opening 81. It is also contemplated that stub shaft 60 may be supported by two spaced bearing means in the event planar motion of shaft 60 is desired. In such bearing arrangement, non-parallel relationship of the axes would be avoided and the axes of the non-rotating and rotating member would be in selected parallel or coincident relationship so as to provide a vibratory or agitating force having two-dimensional characteristics.

It is important to note that the rotating generator housing 30 which surrounds the end of the non-rotating eccentrically positioned shaft 60 serves to load the self-aligning bearing means 65 at its outer race member and thus bearing loads per unit of bearing area are reduced. Such reduction of unit bearing loads permits the motion generator to be operated at relatively high speeds of rotation and small amplitudes of eccentricity, which combination results in rapid effective agitation and separation of the material.

While the relative lateral movement or eccentric throw illustrated in the exemplary embodiment of the invention described above is relatively small it will of course be understood that such eccentric throw or lateral displacement may be greater and may provide vibrational forces having relatively high amplitudes. In such instances the relationship of amplitude and frequency referred to above may be reversed so that the separator apparatus may be operated with relatively high amplitudes and low frequency or rotational speed. It will be apparent to those skilled in the art that the selection of rotational speed and amplitude of eccentric throw will depend upon the characteristics of the material to be separated, the rate of speed at which separation is desired, and the volume of material to be separated being fed to the separator apparatus. Thus the motion generator means described above becomes quite readily adaptable to the separation of different products since the eccentric throw is readily adjusted and the speed of rotation may be readily adjusted.

In the embodiment of the invention shown in FIG. 6 a motion generator means 16 is associated with an inclined rectangular type receptacle means 21', the motion generator means embodying the same construction as that described above.

In FIG. 6 a rectangular type screen means 21' may be suitably supported upon resilient means in well known manner to permit vibration in two or three dimensions of a rectangular material receiving screen box 22'. In such rectangular type screen means it will be understood that the material to be separated may be fed at the top or upper end of the screen box and that as the material flows toward the opposite end of the screen box it is separated by suitable screen mesh. Two or more screen boxes may be assembled in stacked relation in order to provide desired classification separations.

In this example one end of screen box 22' may be provided with a pair of spaced brackets 160 for supporting a transverse pivot pin 161 adjacent the center line of box 22'. Pivot pin 161 provides a pivotal connection to a force transmitting arm or member 162 connected to suitable brackets 164 secured to the head of stub shaft 60 of motion generator means 16. Brackets 164 lie parallel to the axis of the adjustment bolt 63 and therefore in the direction of the eccentric throw provided by the motion generator means. In this example the connection of arm 162 to brackets 164 may be fixed although it will be understood that in some instances it may be desirable to provide a pivotal or other type of connection to brackets 164. It will be apparent from a consideration of FIG. 6 and the several schematic positions of motion generator means 16 as indicated by phantom lines that the motion generator means 16 may be positioned or disposed so that the eccentric throw is transmitted generally horizontally along a horizontally disposed arm 162 to the shaking box end for transmission of force components to the box. Depending upon the type of material being separated it may be desirable to change the position of the motion generator means by swinging the same about the pivot pin 161 through any selected angular disposition indicated here as being within a range of approximately 90°. When the motion generator means 16 is positioned vertically below the pivot pin 161 it will be apparent that the forces transmitted by the motion generator means will be in a vertical direction and in a selected angular relationship with respect to the box 22'. At 45° the transmission of forces through arm 162 would be at an angle which would provide a different action of the screen box 22'. Thus by any suitable angular disposition of the motion generator means 16 about a pivotal connection to the screen box a desired direction of vibration force components may be obtained. Suitable means may be provided for modifying the driving arrangement in order to accommodate such change in angular disposition.

In operation of the separator shown in FIG. 6 it will be apparent that vibratory forces transmitted to the force transmitting arm 162 by the stub shaft 60 will be transmitted similarly to the receptacle means 21' and adjustment of the eccentric throw of the motion generator means 16 will provide for different and selected flow patterns of material on the screen box 22'. It will also be apparent that when the motion generator means which normally has eccentric forces acting in a plane transverse to the axis of stub shaft 60 is angularly positioned with respect to the receptacle means 21' that in addition to dimensional vibratory force components being transmitted to the receptacle means, a vertical force component is also transmitted because of such angular relationship. The motion generator means may be provided with the self-aligning bearing means 65 as described in the prior embodiment in order to further induce vertical vibratory force components to the receptacle means 21'. When the motion generator means 16 lies in a plane parallel with the plane of the receptacle means 21' a two dimensional force component may be transmitted to the receptacle means and essentially a sifting operation is performed upon the material fed to the receptacle means.

While the illustration in FIG. 6 shows a nonchangeable or rigid connection of the arm 162 to the nonrotatable stub shaft 60 it will be understood that a pivotal connection may be made at this point so that if desired the plane of the motion generator means as defined by the generator housing may remain substantially horizontal while the motion generator means 16 is shifted about the pivotal pin 161. It will be understood that various connections may be made between the motion generator means and the receptacle means for the purpose of varying the relative position of one with respect to the other. The illustration in FIG. 6 is illustrative only of one example of such a connection.

It will be understood of course that the motion generator means 16 my be cooperatively associated with a rectangular type screen means at locations other than one end of the screen box and of course may be associated above, below, at the end of, and adjacent the center of the screen box. Such location of the connection may often be determined by the particular manner in which the receptacle means is resiliently supported or suspended and the particular shape and configuration of the receptacle means.

It will be understood that the motion generator means of the present invention is readily adapted to both gyratory type separators and rectangular type separators and may be employed in other installations where a desired vibratory force transmission is required for the purpose of agitating or vibrating materials to be separated. The compactness of motion generator means 16 and its characteristic of eliminating force vibrations to the support means, and its adaptability to small space requirements has provided a multi-purpose versatile motion generator means.

Various modifications and changes may be made in the motion generator means described above which come within the spirit of this invention and all such changes and modifications coming within the scope of the appended claims are embraced thereby.

I claim:

1. A self-balancing motion generator means for use on a material separating means including a screen receptacle adapted to be agitated and carrying said motion generator means, a base means, and driving means including a drive pulley belt for said receptacle on the base means, the combination of: a housing having an axis of rotation and a wall with an axial opening; a shaft portion on said housing co-axial with and below said housing and connected with a drive pulley belt of driving means for rotating said housing; a stub shaft receivable through said axial opening in spaced relation to said housing and connected to said receptacle; bearing means within said housing carried by said stub shaft and supporting said housing, said stub shaft and bearing means being laterally displaceable within said housing; means for moving and retaining said stub shaft and bearing means in selected lateral adjustment; and counterweight means operable within the housing for counterbalancing loads imparted to said housing to maintain a stable axis of rotation of the housing and to thereby impart gyratory motion to said stub shaft and receptacle connected thereto.

2. Means for selectively imparting vibratory force components to a vibratable body means supported for vibration comprising: a non-rotatable shaft portion having an axis; a self-aligning bearing means carried by said shaft portion; a rotatable housing supported from said bearing means and surrounding and enclosing the bearing means in spaced relation to the shaft portion and having an axis of rotation disposed in the same direction as the axis of the shaft portion; means carried by the rotatable housing and cooperably connected with the bearing means for moving the shaft portion and its axis laterally relative to the axis of rotation; said rotatable housing having a peripheral raceway; and ball weight elements movable along said raceway for counterbalancing loads imparted to said housing to maintain a stable axis of rotation of the housing and to thereby impart gyratory motion to said non-rotatable shaft portion and body means connected thereto.

3. A means as stated in claim 2 including a pilot bearing means on the end of said non-rotatable shaft portion and including a pilot bearing housing having a non-circular opening with its long axis lying parallel to the means connecting said housing and bearing means for adjusting to skew relationship of the self-aligning bearing and pilot housing.

4. A means as stated in claim 2 wherein said non-rotatable shaft portion includes an axial bore communicating with the interior of said housing, and a parallel offset bore in said shaft portion in communication with said bearing means whereby rotation of said housing imparts centrifugal forces to lubricating fluid introduced into said axial bore and impels said lubricating fluid through said bearing means and out of said offset bore.

5. Means for vibrating a receptacle for separation of material comprising: a rotatable housing having an axis of rotation and adapted to be connected with a driving means; a non-rotatable shaft having axis extending in the same direction as the axis of rotation, and connected with said receptacle to be vibrated; and means connecting and supporting said housing from said shaft with their axes in selected lateral relationship, said connecting means including bearing means carried by the non-rotatable shaft; and means carried by the housing and connected with the bearing means for moving the axis of the non-rotatable shaft and bearing laterally relative to the axis of the rotatable housing; and means connecting said non-rotatable shaft and bearing laterally relative to the axis of the ber pivotally connected with said receptacle.

6. In combination a spearator receptacle and a motion generator means, said motion generator means including a rotatable housing adapted to be connected with a driving means; a non-rotatable shaft supporting said rotatable housing, means connecting said shaft and coaxial therewith including, bearing means carried by the non-rotatable shaft and having slidable sealed relation with the housing, and means carried by the housing and connected with the bearing means for moving said non-rotatable shaft and bearing laterally relative to said rotatable housing in sealed relation therewith; and means transmitting vibratory forces generated by said motion generator means to said separator receptacle, said transmitting means being adjustably related to said receptacle whereby the principal direction of said transmitted forces may be varied.

7. A motion generator means for imparting vibratory motion components to a resiliently yieldably supported body comprising: a rotatably driven housing having an axis of rotation and a raceway coaxial therewith; a non-rotatable shaft connected with said body and supporting said housing; a self-aligning bearing means carried by the shaft; a bearing housing carried by the self-aligning bearing means and having slidable sealed relation with the driven housing; said shaft having an axis offset from said axis of rotation; and mass means in said raceway movable about the axis of said housing to impart forces to said shaft during rotation of said housing for causing the axis of said shaft to gyrate about said axis of rotation of said housing and to maintain the housing axis of rotation stable.

8. A means for selectively imparting vibratory forces too a vibratable body means supported for vibration, comprising: a rotatable housing having an axis of rotation and including an inner bearing receiving chamber means having a bottom wall; a non-rotatable shaft portion adapted to be connected with a vibratable body means and extending into said bearing chamber means into spaced relation with respect to said bottom wall; bearing means in said bearing chamber means and having an outer race laterally slidably movable in sealed relation with said housing in said bearing chamber means, said rotatable housing being supported from said shaft portion; and an adjustment means carried by said rotatable housing and connected with said outer race member for selected lateral displacement of the axis of said non-rotatable shaft portion with respect to the axis of said rotatable housing, said adjustment means including a threaded end in threaded engagement with said outer race member, a wall defining said bearing chamber, said adjustment means including a threaded portion spaced from said threaded end and having threaded engagement with said wall, the pitch of the threads of the threaded portion being different than the pitch of the threads of the threaded end whereby said outer race member is locked in selected position.

9. A means for selectively imparting vibratory forces to a vibratable body means supported for vibration comprising: a rotatable housing having an axis of rotation and including an inner bearing receiving chamber means having a bottom wall; a non-rotatable shaft portion adapted to be connected with a vibratable body means and extending into said bearing chamber means into spaced relation with respect to said bottom wall; bearing means in said bearing chamber and having an outer race member laterally slidably movable in sealed relation with said housing in said bearing chamber means, said rotatable housing being supported from said shaft portion; and an adjustment means carried by said rotatable housing and connected with said outer race member for selected lateral displacement of the axis of said non-rotatable shaft portion with respect to the axis of said rotatable housing; said housing including an annular outer chamber, a partition in said outer chamber diametrically opposite said adjustment means, and movable counterweight means in said chamber on opposite sides of said partition.

10. A means as stated in claim 9 including a fluid contained within said annular outer chamber.

11. Means for imparting vibratory gyratory motion to a floating yieldable body comprising: a non-rotatable shaft having an axis and adapted to be connected to a yieldable body to be vibrated; a rotatably driven shaft supported from said non-rotatable shaft and having an axis of rotation; means providing a floating driven connection to the rotatable driven shaft; and means connecting said shafts with their axes in selected lateral relation, said connecting means including a housing on said rotatable shaft and coaxial therewith, self-aligning bearing means carried by the non-rotatable shaft; means carried by the housing and connected with the bearing means for moving the axis of the non-rotatable shaft and bearing laterally relative to the axis of the rotatable shaft; and means to stabilize the axis of rotation of the rotatably driven shaft and cooperable with said housing.

12. A vibration means as stated in claim 11 wherein said housing includes a peripheral raceway coaxial with said axis of rotation, and a plurality of movable counterweight elements in said raceway and responsive to unbalancing forces imparted to said rotating shaft for compensating said unbalanced forces to stabilize the axis of rotation of the rotating shaft and to impart gyratory motion to said non-rotatable shaft.

References Cited by the Examiner
UNITED STATES PATENTS

| | | | |
|---|---|---|---|
| 1,002,476 | 9/1911 | Watters | 209—366 |
| 1,188,903 | 6/1916 | Cornwall | 74—87 |
| 1,413,672 | 4/1922 | Lowe | 209—332 |
| 2,023,180 | 12/1935 | Perkinson | 74—86 |
| 2,331,756 | 10/1943 | Zobel | 74—573 |
| 2,659,243 | 11/1953 | Darrieus | 74—573 X |
| 2,713,637 | 7/1955 | Wuerth et al. | 74—86 X |
| 2,723,753 | 11/1955 | Cook | 209—332 |
| 2,747,418 | 5/1956 | Eckley | 74—87 |
| 2,860,783 | 11/1958 | Johnson | 74—87 X |
| 3,169,108 | 2/1965 | Dietert | 74—87 X |

FRED C. MATTERN, JR., *Primary Examiner.*

GEORGE J. NORTH, BROUGHTON G. DURHAM, *Examiners.*

F. E. BAKER, *Assistant Examiner.*